United States Patent [19]
Simpson et al.

[11] Patent Number: 5,925,223
[45] Date of Patent: Jul. 20, 1999

[54] PROCESS FOR IMPROVING THERMAL EFFICIENCY WHILE PRODUCING POWER AND DESALINATING WATER

[76] Inventors: Gary D. Simpson, 15434 Tadworth Dr., Houston, Tex. 77062; Karl Lin, 13131 Fallsview Ln, #725, Houston, Tex. 77077

[21] Appl. No.: 08/831,315

[22] Filed: Apr. 1, 1997

Related U.S. Application Data

[63] Continuation-in-part of application No. 08/419,023, Apr. 10, 1995., Pat. No. 5,622,605, which is a continuation-in-part of application No. 08/147,884, Nov. 5, 1993., Pat. No. 5,405,503

[51] Int. Cl.$^6$ .................. B01D 3/06; C02F 1/06; F01K 17/00
[52] U.S. Cl. .................. 203/11; 60/648; 60/653; 60/676; 159/2.1; 159/17.1; 159/24.1; 159/DIG. 8; 202/160; 202/174; 202/176; 203/2; 203/22; 203/23; 203/24; 203/27; 203/71; 203/88; 203/DIG. 8; 203/DIG. 9; 203/DIG. 20; 203/DIG. 17
[58] Field of Search .................. 203/10, 11, 2, 203/23, 24, 26, 22, 39, 40, 73, 88, 27, 4, 71, DIG. 8, DIG. 9, DIG. 17, DIG. 20; 159/2, 3, 2.1, 17.1–17.3, DIG. 8, 24.1, 47.1, 124.2; 202/160, 176, 173, 174; 60/685, 646, 648, 653, 676

[56] References Cited

U.S. PATENT DOCUMENTS

| | | | |
|---|---|---|---|
| 2,759,882 | 8/1956 | Worthen et al. | 159/2.3 |
| 3,152,053 | 10/1964 | Lynam | 159/2.3 |
| 3,438,202 | 4/1969 | Roe | 159/2.3 |
| 3,461,460 | 8/1969 | McGrath | 203/11 |
| 3,607,668 | 9/1971 | Williamson | 202/173 |
| 3,803,846 | 4/1974 | Letvin | 60/685 |
| 3,844,899 | 10/1974 | Sager, Jr. | 202/173 |
| 3,893,299 | 7/1975 | Hutchinson et al. | 60/641 |
| 3,926,739 | 12/1975 | Izumi | 202/174 |
| 4,054,493 | 10/1977 | Roller | 203/88 |
| 5,346,592 | 9/1994 | Madani | 203/10 |
| 5,386,685 | 2/1995 | Frutschi | 60/39.02 |

*Primary Examiner*—Virginia Manoharan
*Attorney, Agent, or Firm*—Kenneth A. Robby

[57] ABSTRACT

A process and apparatus for improving the thermal efficiency of a steam turbine power generating plant while simultaneously desalinating seawater or brine and purifying water which contains minerals, salts, and other dissolved solids. Exhaust gases from a power plant is heat exchanged against water in a secondary ecomomizer which circulates water at a temperature near, or slightly above the dewpoint of the combustion exhaust of the high-pressure boiler. The heated water is flashed to produce low-pressure steam. The low-pressure steam is condensed against the last effect of a multi-effect desalinization unit. Steam from the first effect of the desalination unit is condensed against steam condensate from the power plant turbine to preheat the condensate and thereby recover heat from the power plant's exhaust gas. Salinous water is fed to the multi-effect desalinization unit to produce fresh water and a concentrated brine. The low-pressure steam is used to replace high-pressure steam that is used for preheating and deareation of feedwater for the boiler.

12 Claims, 4 Drawing Sheets

PROCESS FOR IMPROVING THERMAL EFFICIENCY WHILE PRODUCING POWER AND DESALINATING WATER

CROSS REFERENCE TO RELATED APPLICATION

This application is a continuation-in-part of U.S. patent application Ser. No. 08/419,023, filed Apr. 10, 1995, now U.S. Pat. No. 5,622,605, which is a continuation-in-part of U.S. patent application Ser. No. 08/147,884, filed Nov. 5, 1993, now U.S. Pat. No. 5,405,503.

BACKGROUND OF THE INVENTION

1. Field of the Invention

This invention relates generally to power generating processes, and more particularly to a process for improving the thermal efficiency of a steam turbine power generating plant while simultaneously desalinating seawater or brine or purifying fresh water containing minerals, salts, and other dissolved solids. Efficiency is improved by utilizing a secondary economizer to increase high-pressure steam capacity and using low-pressure steam to replace high-pressure steam that is used for preheating and deareation of feedwater. Fresh water may be produced by multi-effect evaporation.

2. Brief Description of the Prior Art

As world population increases, demand for power and fresh water will also increase. Pollutants and drought result in a shortage of fresh water in many locations. Therefore, it would be desirable to provide a process utilizing desalination and distillation combined with power generation whereby demand for power and fresh water can be simultaneously satisfied.

Conventional methods for power generation include the steam cycle, cogeneration cycle, and the combined cycle. In the steam cycle, water is heated to produce steam at high temperature and pressure. The steam is typically superheated and expanded across a turbine to produce power. The steam will frequently be heated again and expanded across a turbine a second time. The steam will then be condensed at a low temperature and the cycle is repeated.

In a conventional cogeneration and combined cycle, high-pressure combustion products are expanded across a turbine to produce power. The combustion products are then heat exchanged against a boiler to produce steam. The resultant steam may then be sold or may be used to produce power.

Most previous methods of desalination have been stand-alone processes. Hence, they have focused upon energy efficiency to satisfy economics. Several of the commercial methods include reverse osmosis, evaporation, and vapor recompression. Dual purpose power plants have also been utilized.

Reverse osmosis is a technology wherein fresh water is extracted from saline water by pressure. This is accomplished by circulating saline water under high-pressure (i.e., 1000–2000 psig) around a loop. One portion of the loop is adjacent to a membrane. The membrane selectively allows water to pass through it while preventing the passage of most ions. Effectively, fresh water is squeezed from the saline water. Excellent energy efficiency can be achieved by this method. However, the membranes are prone to pluggage and in practice the fresh water produced is not completely free of dissolved salts. The present process, on the other hand, produces fresh water by a phase change and produces power.

Evaporation is the boiling of salinous water by the addition of heat followed by condensation of the resulting steam by heat exchange. Evaporators are typically classified as boiling or flashing. A large amount of heat input is required. Single stage evaporation is the least efficient of the existing methods. Multi-stage evaporation can have an energy cost similar to that of reverse osmosis. The present process uses evaporation wherein the waste heat used in the evaporation cycle is recovered.

Vapor recompression is a technology wherein water boils itself. This is accomplished by boiling water at low-pressure to produce water vapor. The water vapor is compressed and heated by doing work upon it. The heated water vapor is then condensed by heat exchange against the boiling water. The net result is that a phase change is accomplished by doing work. The latent heat of vaporization begins and ends at the same point within the vapor recompression process. In the present process, on the other hand, the latent heat originates and ends at different points outside the process.

Dual purpose desalination/power plants currently in use produce fresh water by using the exhaust steam as a source of heat for an evaporator. The exhaust steam is condensed against the boiler of the evaporator. Essentially, the power plant's condenser is replaced by the last effect of a multi-effect evaporator. This allows for the production of an enormous amount of fresh water. As the boiler duty increases with fresh water production, the temperature of the condensing exhaust steam also increases. This reduces the thermodynamic efficiency of the power plant providing the steam. In the present process efficiency of the power plant is not adversely affected by increasing the fresh water production rate. In fact, energy efficiency is improved by the recovery of additional waste heat from the stack exhaust.

Power generation using steam expansion is a common process. Condensate is deareated and preheated and then fed to a boiler and heated. Steam is removed from the boiler and typically superheated. It then expands across a turbine, thereby doing work. The steam is then condensed and recycled to the boiler. A moderate amount of liquid is intermittently withdrawn from the boiler to prevent sludge accumulation. Treated fresh water is added to the system to compensate for material losses. The present process, on the other hand, improves the thermal efficiency of a power plant by recovering additional waste heat from the exhaust gas using a secondary economizer.

There are several patents, which disclose various desalinating processes, some of which also generate power.

Simpson et al, U.S. Pat. No. 5,622,605 discloses a process which utilizes geothermal brine to generate power in a closed system with the exclusion of air to minimize corrosion. Steam from geothermal brine contains significant quantities of soluble salts including sodium and potassium chloride, calcium salts and iron and manganese salts, which have a strong corrosive action on turbine blades and related equipment. In this process, hot geothermal brine is flashed in a flash zone to form steam and concentrated brine and the steam is used to drive a power-generating turbine. The exhaust steam from the turbine is condensed and the major portion of the condensed steam is combined with the concentrated brine to form a restored brine, and the restored brine is returned to the geothermal hot brine well.

Kutchinson et al, U.S. Pat. No. 3,893,299 discloses a geothermal heat recovery process wherein hot water from a geothermal well is passed through successive flash chambers operating at successively lower temperatures and the steam from each flash chamber is passed in heat exchange relationship with a working fluid operating in a closed loop which is expanded in a power extracting gas expansion device for generating power. The hot fluid at the output of each heat exchange is either combined with the steam at the output of the next flash chamber or applied to the input of the next flash chamber with the hot fluid that is not converted to steam.

Spears, Jr., U.S. Pat. No. 4,078,976 discloses a potable recovery and power generating process which utilizes solar power for recovering potable water from salinous water. A portion of salinous water and an air stream are introduced into a solar radiation heat sink and heated water-containing air is withdrawn and condensed into potable drinking water. The heated salinous water is withdrawn from the solar radiation heat sink and recycled, and a part of the heated salinous water is flashed and the resultant vapor is passed through turbines to generate power and the exiting turbine vapors are cooled or condensed by contact with a second portion of the salinous water to recover addition potable water.

Pitcher, U.S. Pat. No. 4,267,022 and Gress, U.S. Pat. No. 4,310,382 disclose processes which utilize air as a working fluid for desalination and heat pumps for transferring latent heat associated with vaporizing or condensing water from one part of the process to another.

Mock, U.S. Pat. No. 4,276,124 and Elmore, U.S. Pat. No. 5,096,543 are essentially low-efficiency evaporator systems which utilize air as a working fluid to transport water vapor from one part of the system to another.

Becker, U.S. Pat. No. 3,557,863 discloses a process for obtaining fresh water from saline water by injecting saline water through nozzles into a hot high-pressure gas directed into an evaporation chamber to evaporate the saline water and generate a gas-vapor mixture and a precipitate. The gas-vapor mixture and the precipitate are separately withdrawn from the chamber. The gas-vapor mixture is engine expanded and then cooled to condense out fresh water.

Williamson, U.S. Pat. No. 3,489,652 teaches indirect contact of the saline water with the heat source in a heat exchanger at the first part of the process and then flash evaporating the saline water in successive stages in a multi-stage flash evaporator to produce a vapor fraction and a brine fraction in each stage and the brine is finally discharged as waste.

Martin, U.S. Pat. No. 3,950,949 discloses a process whereby steam is expanded to produce power. Low-grade heat such as solar or geothermal heat is used to heat a liquid to saturation temperature in a first boiler or heat exchanger and the vapor leaving the boiler or heat exchanger passes through a vapor phase regenerator which provides a first increment of superheat and to a superheater where it is superheated by a high-grade heat source (focused solar radiation or combustion). The superheated steam or vapor leaving the superheater is expanded in a turbine (expansion engine). The superheated steam expanded in the turbine is passed through the vapor phase regenerator where it heats the fluid which is being fed to the superheater and then passes to a liquid phase regenerator which serves to preheat the liquid being fed to the boiler or heat exchanger.

Kestner, British Patent 165,066 discloses a process using a group of boilers fed with distilled water combined with a distilling boiler which is not fed with distilled water, or an evaporator (low-pressure boiler) heated by steam from the group of boilers. Distilled water obtained from natural water and purified by the blow-down from the boilers is used as make-up for the liquid loss due to the blow-down.

The present invention is distinguished over the prior art in general, and these patents in particular by a process and apparatus for improving the thermal efficiency of a steam turbine power generating plant while simultaneously desalinating seawater or brine and purifying water which contains minerals, salts, and other dissolved solids. Exhaust gases from a power plant is heat exchanged against water in a secondary ecomomizer which circulates water at a temperature near, or slightly above the dewpoint of the combustion exhaust of the high-pressure boiler. The heated water is flashed to produce low-pressure steam. The low-pressure steam is condensed against the last effect of a multi-effect desalinization unit. Steam from the first effect of the desalination unit is condensed against steam condensate from the power plant turbine to preheat the condensate and thereby recover heat from the power plant's exhaust gas. Salinous water is fed to the multi-effect desalinization unit to produce fresh water and a concentrated brine. The low-pressure steam is used to replace high-pressure steam that is used for preheating and deareation of feedwater for the boiler.

SUMMARY OF THE INVENTION

It is therefore an object of the present invention to provide a process for improving the thermal efficiency of a steam turbine power generating plant.

It is another object of this invention to provide a process for improving the thermal efficiency of a steam turbine power generating plant while also desalinating seawater.

Another object of this invention is to provide a process for improving the thermal efficiency of a steam turbine power generating plant which utilizes low-pressure steam to perform preheating operations for a high-pressure boiler.

Another object of this invention is to provide a process for improving the thermal efficiency of a steam turbine power generating plant which utilizes low-pressure steam to perform preheating operations for a high-pressure boiler while also desalinating seawater.

A further object of this invention is to provide a process for improving the thermal efficiency of a steam turbine power generating plant which circulates water at a temperature near, or slightly above the dewpoint of the combustion exhaust of a high-pressure boiler through a secondary economizer to remove heat from the stack exhaust.

A still further object of this invention is to provide a process for improving the thermal efficiency of a steam turbine power generating plant which circulates water at a temperature near, or slightly above the dewpoint of the combustion exhaust of a high-pressure boiler through a secondary economizer and then flashes it to produce low-pressure steam which is used as the heat supply for a multi-effect desalanization unit.

Other objects of the invention will become apparent from time to time throughout the specification and claims as hereinafter related.

The above noted objects and other objects of the invention are accomplished by a process and apparatus for improving the thermal efficiency of a steam turbine power generating plant while simultaneously desalinating seawater or brine and purifying water which contains minerals, salts, and other dissolved solids. Exhaust gases from a power plant is heat exchanged against water in a secondary ecomomizer which circulates water at a temperature near, or slightly above the dewpoint of the combustion exhaust of the high-pressure boiler. The heated water is flashed to produce low-pressure steam. The low-pressure steam is condensed against the last effect of a multi-effect desalinization unit. Steam from the first effect of the desalination unit is condensed against steam condensate from the power plant turbine to preheat the condensate and thereby recover heat from the power plant's exhaust gas. Salinous water is fed to the multi-effect desalinization unit to produce fresh water and a concentrated brine. The low-pressure steam is used to replace high-pressure steam that is used for preheating and deareation of feedwater for the boiler.

DESCRIPTION OF THE PREFERRED EMBODIMENT

The advantages of the present invention are best understood by a comparison with conventional power generation processes.

Figure 1:
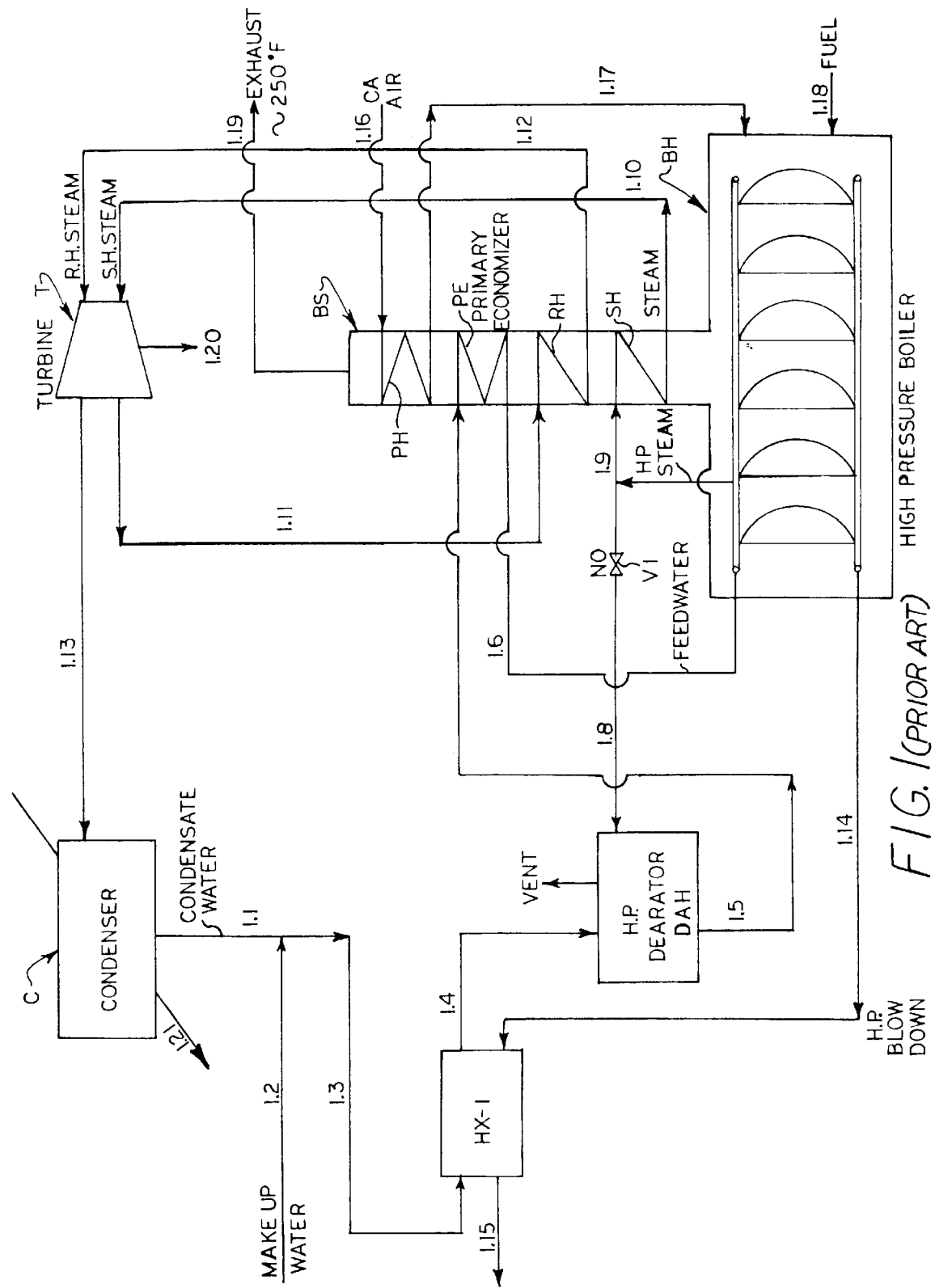
FIG. 1 is a schematic illustration of a conventional power generation process used in a typical power plant of the prior art.

Referring now to FIG. 1 of the drawings by numerals of reference, there is shown schematically, a conventional process for producing power in a typical power plant of the prior art. Table 1 below corresponds to FIG. 1, and shows the heat and material balance values for a typical 100 MW power plant with a thermal efficiency of about 31%. The reference numerals under the heading STREAM correspond to the numbered flow lines in FIG. 1.

In the prior art process, a single high-pressure boiler BH is used to produce steam for both a high-pressure deareator DAH and a turbine T. A single high-pressure boiler is normally used due to economies of scale. In other words, it is less expensive to build one high-pressure boiler of a given capacity that it is to build two boilers (one low-pressure boiler and one high-pressure boiler) with a combined capacity equal to the capacity of the single boiler.

As shown in FIG. 1, a fuel such as natural gas or fuel oil is fed to the firebox of the high-pressure boiler BH through line 1.18. Combustion air CA is fed through a preheater portion PH of the high-pressure boiler stack BS through line 1.16 and is routed through line 1.17 to the firebox of the high-pressure boiler.

High-pressure steam is removed from the boiler BH via line 1.7 and a portion is routed through line 1.9 to a superheater portion SH of the boiler stack BS and the superheated steam is carried from the superheater SH to the high-pressure part of a steam turbine T through line 1.10. The superheated steam expands against the turbine T and passes via line 1.11 to a reheater portion RH of the stack BS where it is reheated by combustion exhaust 1.19 and then routed to the low-pressure part of the turbine T via line 1.12. The reheated steam expands again against the turbine T and is routed to a condenser C via line 1.13. Power is generated as the high-pressure steam and reheated steam expands against the turbine, and is removed via a power take-off shaft.

Condensed water is removed from the condenser C via line 1.1, make-up water is mixed with the condensate via line 1.2, and the mixture is routed via line 1.3 through a feedwater preheater HX-1 and from the preheater to a high-pressure deareator DAH via line 1.4. The preheated and deareated feedwater is conducted via line 1.5 from the high-pressure deareator DAH to a primary feedwater economizer portion PE of the stack BS where it is reheated by combustion exhaust 1.19.

Another portion of the high-pressure steam from the high-pressure boiler BH is routed through valve V1 and line 1.8 to the high-pressure dearator DAH and is used to control the temperature of preheated feed water. Blowdown is removed from the high-pressure boiler BH and is routed via line 1.14 to the preheater HX-1 where the sensible heat from the blowdown is used to preheat the boiler feedwater.

TABLE 1

100 MW POWER PLANT, 31% THERMAL EFFICIENCY

| STREAM | T (° F.) | P (psia) | m (lbs/hr) |
|---|---|---|---|
| 1.1 | 80 | 0.5 | 655,000 |
| 1.2 | 80 | 14.7 | 14,400 |
| 1.3 | 80 | 18.0 | 669,400 |
| 1.4 | 91 | 18.0 | 669,400 |
| 1.5 | 223 | 1325.0 | 759,000 |
| 1.6 | 390 | 1325.0 | 759,000 |
| 1.7 | 580 | 1325.0 | 744,600 |
| 1.8 | 580 | 1325.0 | 89,600 |
| 1.9 | 580 | 1325.0 | 655,000 |
| 1.10 | 1000 | 1325.0 | 655,000 |
| 1.11 | 350 | 100.0 | 655,000 |
| 1.12 | 1000 | 100.0 | 655,000 |
| 1.13 | 150 | 2.5 | 655,000 |
| 1.14 | 580 | 1325.0 | 14,400 |
| 1.15 | 100 | 14.7 | 14,400 |
| 1.16 | 80 | 14.7 | 1,063,100 |
| 1.17 | 601 | 14.7 | 1,063,100 |
| 1.18 | 80 | 50.0 | 57,600 |
| 1.19 | 256 | 14.7 | 1,120,700 |
| 1.20 | — | — | — |
| 1.21 | 80 | 14.7 | 79,000,000 |

Combustion exhaust 1.19 leaves the stack BS after being cooled by heat exchange against the primary feed water economizer PE, air heater PH, steam superheater SH, and steam reheater RF conduits in the stack BS.

The temperature of the stack exhaust 1.19 in the conventional process is typically ~250° F. and has a dewpoint of ~150° F. With the flow scheme of FIG. 1, it is not economical to add heat transfer area to further cool the stack exhaust. The thermal efficiency of the prior art process of FIG. 1 could be improved by heat exchanging the feedwater stream 1.3 against the stack exhaust stream 1.19 to reduce the exhaust temperature. However, the temperature of the feedwater stream 1.3 (~80° F.) is below the dew point of the exhaust stream 1.19 (~150° F.). Thus, some condensation would occur on the exhaust gas side of such a heat exchanger. Also, severe corrosion would occur due to the presence of $CO_2$ and/or $SO_2$ in the exhaust. As described hereinafter, the present process overcomes these problems and also provides for water production.

Figure 2A:
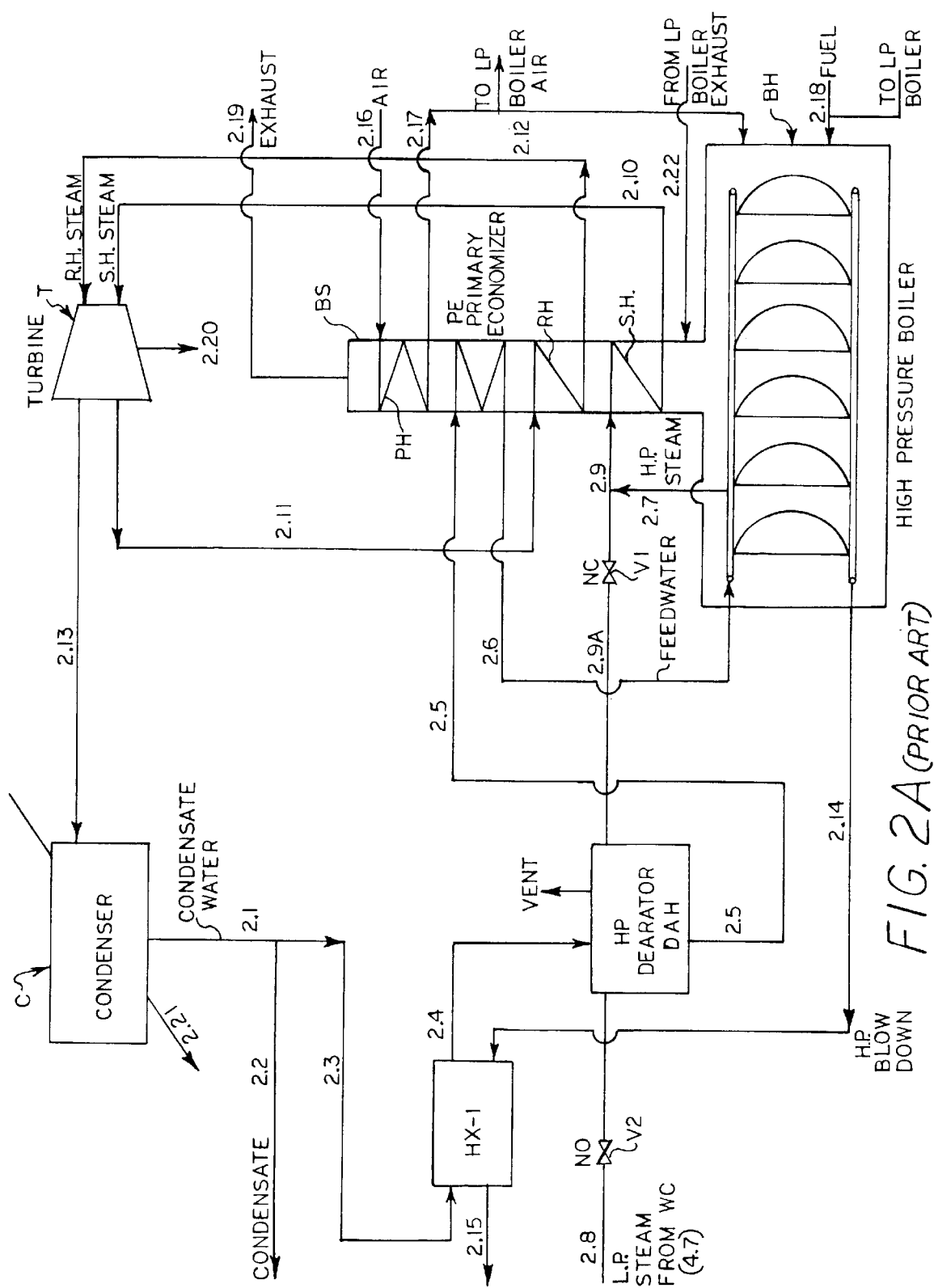
FIGS. 2A and 2B, taken together, are a schematic illustration of a conventional power generation process used in a typical power plant of the prior art wherein low-pressure steam is used to replace high-pressure steam for preheating and deareation.
Figure 2B:
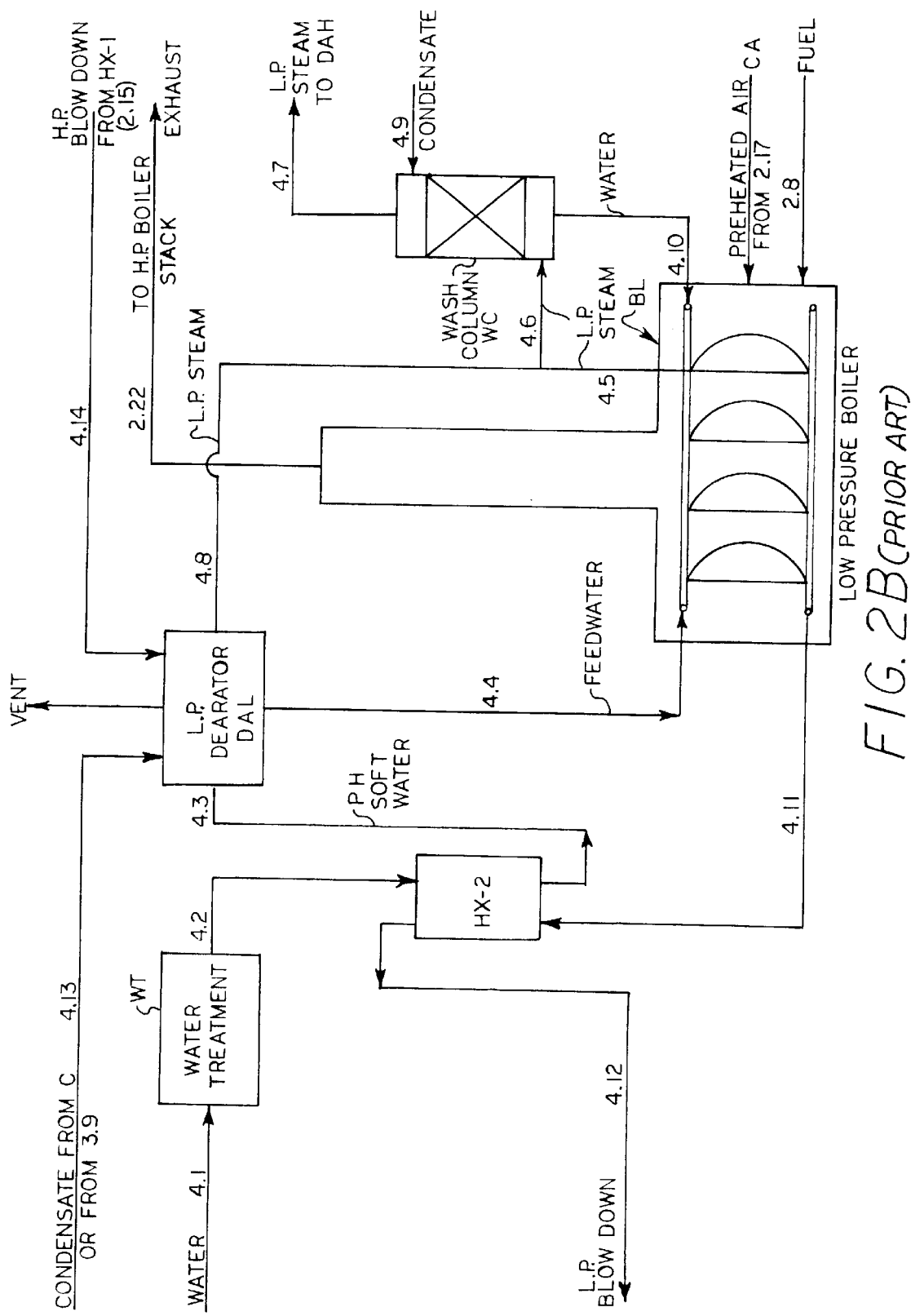

FIGS. 2A and 2B together show schematically, another conventional process for producing power in a typical power plant of the prior art. In this process, the feedwater for a high-pressure boiler BH (FIG. 2A) is preheated by low-pressure steam from a low-pressure boiler BL (FIG. 2B). Tables 2A and 2B below correspond to FIGS. 2A and 2B respectively, and show the heat and material balance values for a typical 100 MW power plant using low-pressure steam to preheat feedwater for the high-pressure boiler. The reference numerals under the heading STREAM correspond to the numbered flow lines in FIGS. 2A and 2B.

As shown in FIGS. 2A and 2B, a fuel such as natural gas or fuel oil is fed to the firebox of the high-pressure boiler BH through line 2.18 and to the low-pressure boiler BL. Combustion air CA is fed through an air preheater portion PH of the high-pressure boiler stack BS through line 2.16 and a portion of the preheated air is routed through line 2.17 to the firebox of the high-pressure boiler BH and another portion is routed to the firebox of the low-pressure boiler BL.

High-pressure steam is removed from the high-pressure boiler BH via line 2.7 and a portion is routed through line 2.9 to a superheater portion SH of the boiler stack BS and the superheated steam is carried from the superheater SH to the high-pressure part of a steam turbine T through line 2.10. The superheated steam expands against the turbine T and passes via line 2.11 to a reheater portion RH of the stack BS where it is reheated by combustion exhaust 2.19 and then routed to the low-pressure part of the turbine T via line 2.12. The reheated steam expands again against the turbine T and is routed to a condenser C via line 2.13. Power is generated as the high-pressure steam and reheated steam expands against the turbine, and is removed via a power take-off shaft.

Condensed water is removed from the condenser C via line 2.1 and a portion of the condensate is routed via line 2.3 through a feedwater preheater HX-1 and from the preheater to a high-pressure deareator DAH via line 2.4. The preheated and deareated feedwater is conducted via line 2.5 from the high-pressure deareator DAH to a primary feedwater economizer portion PE of the stack BS where it is reheated by combustion exhaust 2.19. Another portion of the condensate from condenser C is routed through line 4.13 to a low-pressure deareator DAL (FIG. 2B).

Optionally, another portion of the high-pressure steam from the high-pressure boiler BH (FIG. 2A) may be routed through line 2.9A to the high-pressure dearator DAH through the valve V1 to be used for controlling the temperature of preheated feed water. Blowdown is removed from the high-pressure boiler BH and is routed via line 2.14 to the preheater HX-1 where the sensible heat from the blowdown is used to preheat the boiler feedwater. A portion of the blowdown from the preheater HX-1 is routed through line 2.15 to the low-pressure deareator DAL (FIG. 2B).

Referring again to FIG. 2B, a portion of the fuel fed to the firebox of the high-pressure boiler BH is fed through line 2.8 to the firebox of the low-pressure boiler BL. A portion of the preheated air from the air preheater portion PH of the high-pressure boiler stack BS is routed from line 2.17 to the firebox of the low-pressure boiler BL. A portion of the condensate from condenser C is routed through line 2.2/4.13 to the low-pressure deareator DAL, and a portion of the high-pressure blowdown from the high-pressure feedwater preheater HX-1 is routed through line 4.14 to the low-pressure deareator DAL.

Low-pressure steam is removed from the low-pressure boiler BH via line 4.5–4.8 and a portion is routed through line 4.6 to a wash column WC. Water that contains trace salts and inorganic materials is removed from the wash column WC via line 4.10 and recycled to the low-pressure boiler BL. Washed low-pressure steam is carried from the wash column WC and introduced into the high-pressure deareator DAH of the high-pressure boiler via line 4.7–2.8 and valve V2.

Water is introduced via line 4.1 to a water treatment unit WT where scale causing minerals, such as calcium and magnesium are exchanged for sodium and other chemicals may be added to destroy contaminants. The treated soft water is then fed by line 4.2 to a low-pressure feedwater preheater HX-2. The preheated feedwater is conducted from low-pressure feedwater preheater HX-2 to the low-pressure deareator DAL.

The mixture of the condensate from condenser C, portion of the high-pressure blowdown from the high-pressure feedwater preheater HX-1 and the preheated soft water is then fed from the low-pressure deareator DAL through line 4.4 as feedwater to the low-pressure boiler BL.

Blowdown is removed from the low-pressure boiler BL via line 4.11 and is routed to the low-presssure preheater HX-2 where the sensible heat from the brine is used to preheat the low-pressure boiler feed water. Cooled blowdown exits the low-pressure preheater HX-2 via line 4.12.

The combustion exhaust from the low-pressure boiler BL is routed via line 2.22 to the lower portion of the high-pressure boiler stack BS. Thus, in the prior art process of FIGS. 2A and 2B, combustion exhaust 2.19 (~274° F.) leaves the high-pressure boiler stack BS after being cooled by heat exchange against steam superheater SH, steam reheater RH, the primary feedwater economizer PE, and air heater PH conduits in the stack.

TABLE 2A

100 MW POWER PLANT, LOW-PRESSURE STEAM PREHEATING FEEDWATER

| STREAM | T (° F.) | P (psia) | m (lbs/hr) |
|---|---|---|---|
| 2.1 | 80 | 0.5 | 655,000 |
| 2.2 | 80 | 0.5 | 64,400 |
| 2.3 | 80 | 18.0 | 590,600 |
| 2.4 | 93 | 18.0 | 590,600 |
| 2.5 | 223 | 1325.0 | 669,400 |
| 2.6 | 420 | 1325.0 | 669,400 |
| 2.7 | 580 | 1325.0 | 655,000 |
| 2.8 | 260 | 35.0 | 78,800 |
| 2.9 | 580 | 1325.0 | 655,000 |
| 2.10 | 1000 | 1325.0 | 655,000 |
| 2.11 | 350 | 100.0 | 655,000 |
| 2.12 | 1000 | 100.0 | 655,000 |
| 2.13 | 150 | 2.5 | 655,000 |
| 2.14 | 580 | 1325.0 | 14,400 |
| 2.15 | 100 | 14.7 | 14,400 |
| 2.16 | 80 | 14.7 | 1,067,000 |
| 2.17 | 618 | 14.7 | 1,067,000 |
| 2.18 | 80 | 50.0 | 57,800 |
| 2.19 | 274 | 14.7 | 1,124,800 |
| 2.20 | — | — | — |
| 2.21 | 80 | 14.7 | 79,000,000 |

TABLE 2B

100 MW POWER PLANT, LOW-PRESSURE STEAM PREHEATING FEEDWATER

| STREAM | T (° F.) | P (psia) | m (lbs/hr) |
|---|---|---|---|
| 4.1 | 80 | 14.7 | 5,000 |
| 4.2 | 80 | 18.0 | 5,000 |
| 4.3 | 223 | 18.0 | 5,000 |
| 4.4 | 223 | 18.0 | 58,900 |
| 4.5 | 260 | 35.0 | 57,300 |
| 4.6 | 260 | 35.0 | 53,800 |
| 4.7 | 260 | 35.0 | 53,400 |
| 4.8 | 260 | 35.0 | 3,500 |
| 4.9 | 132 | 35.0 | 3,000 |
| 4.10 | 260 | 35.0 | 3,400 |
| 4.11 | 260 | 35.0 | 5,000 |
| 4.12 | 117 | 14.7 | 5,000 |
| 4.13 | 132 | 35.0 | 36,000 |
| 4.14 | 223 | 1325.0 | 14,400 |

The most significant difference between the values shown in Table 1 and Tables 2A–2B is the increase in exhaust temperature (from ~250° F. to ~274° F.), and the resulting decrease in fuel efficiency. This is due to the decrease in the flow rate through the primary feedwater economizer PE. In other words, the material that was circulating through the economizer and being used for preheat in FIG. 1 is not doing so in FIGS. 2A–2B. This decrease in thermal efficiency is not desirable. As described hereinafter, the present process overcomes these problems and also provides for water production.

Figure 3:
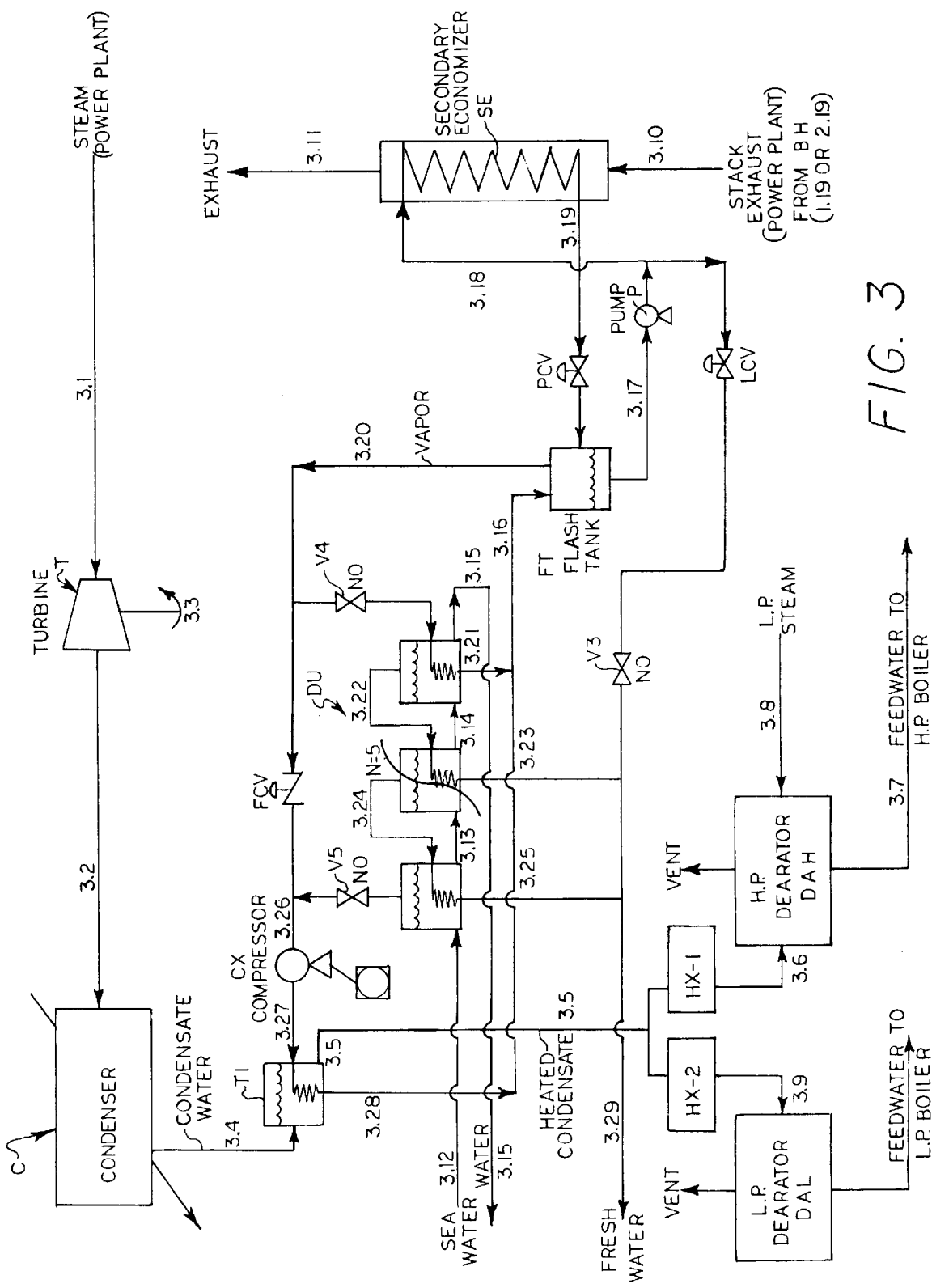
FIG. 3 is a schematic illustration of the power generation process in accordance with the present invention which significantly improves the thermal efficiency of a pwer plant and simultaneously desalinates seawater or brine.

Referring now to FIG. 3, the process in accordance with the present invention is shown. In this example, the present process is utilized to recover the heat from the stack exhaust and improve the thermal efficiency of the typical single high-pressure boiler power plant of FIG. 1, or the two boiler power plant of FIGS. 2A–2B. The present process also allows for water production via a multi-effect distillation cycle.

In the present process, low-pressure steam is used to preheat the boiler feedwater. Heat is recovered from the exhaust gas and is also used to partially preheat feedwater. This results in a decrease in the amount of steam needed for preheating at the deareator and improves the thermal efficiency. When desalinization is included, some compressor work must be performed to maintain vacuum and move steam to the feedwater preheater of the deareator unit. Although this somewhat lessens the thermal efficiency, there is still a net gain in efficiency.

Table 3 below corresponds to FIG. 3, and shows the heat and material balance values when the present process is used to recover heat from a typical 100 MW power plant using a high-pressure and a low-pressure boiler (FIGS. 2A and 2B). The reference numerals under the heading STREAM correspond to the numbered flow lines of FIG. 3.

As shown in FIG. 3, the stack exhaust of the high-pressure boiler BH (1.19 of FIG. 1 and/or 2.19 of FIG. 2A) is fed via line 3.10 through a secondary economizer SE. The secondary economizer contains conduit which is connected with a multi-effect desalinization unit DU. The superheated steam and reheated steam from the high-pressure boiler stack BS (FIGS. 1 and 2A) is expanded against the turbine T and routed to the condenser C via line 3.2, and power is generated as the high-pressure steam and reheated steam expands against the turbine, and is removed via a power take-off shaft, as described previously.

Condensate from the condenser C is collected in tank T1. A portion of the condensate is conducted from the tank T1 via lines 3.5 and through line 3.6 to the feedwater preheater HX-1 of the high-pressure deareator DAH and another portion is conducted via line 3.9 to the feedwater preheater HX-2 of the low-pressure deareator DAL to be used as feedwater for the high-pressure boiler BH and low-pressure boiler BL.

Seawater or water which contains minerals, salts, and other dissolved solids is supplied consecutively into multiple effect trains of the desalinization unit DU via lines 3.12, 3.13, 3.14, and the desalinated water is returned through line 3.15. Fresh water is drawn through line 3.17 from a flash tank FT by a pump P and a portion is conducted via line 3.18 through the secondary economizer SE to be heated. Another portion of the fresh water may be pumped from the flash tank FT through level control valve LCV and control valves V3. The heated fresh water is returned from the secondary economizer SE to the flash tank FT via line 3.19 and pressure control valve PCV.

After being heated in the secondary economizer SE, the heated fresh water stream 3.19 flashes to produce water vapor. The water vapor from the flash tank FT is conducted via line 3.20 through a flow control valve FCV, a compressor CX through line 3.26, and via line 3.27 through the condensate in the tank T1, and returned to the flash tank FT via line 3.28 and 3.16. The vapor passing through line 3.27 preheates the condensate in tank T1 before the condensate is conducted to the preheaters of the high-pressure and low-pressure deareators. The water vapor from the flash tank FT may also be conducted through valve V4 and line 3.21 through the salinous water in the last effect of the desalinization train to heat the salinous water and joined into the condensate line 3.16 to return to the flash tank FT.

The vapor of the heated salinous water from the last effect of the desalinization unit train heated by the flashed water vapor is passed via line 3.22 through the salinous water in the previous train and joined by line 3.23 into the fresh water outlet line 3.29. The vapor in the salinous water from the second to last effect of the desalinization unit train heated by previous salinous water vapor is passed via line 3.24 through the salinous water in the first train and joined by line 3.25 into the fresh water outlet line 3.29. Thus, water vapor stream 3.20 from the flash tank FT may be used to supply heat to the desalinization unit train DU or may be routed directly to the high-pressure or low-pressure feedwater preheater HX-1 or HX-2 of the deareator DAH or DAL.

In a desalinization mode, water vapor stream 3.20 is condensed against the last effect of the desalinization unit DU. The condensate stream 3.21 of stream 3.20 returns to the flash tank FT via line 3.16. The latent heat released by the water vapor stream 3.20 causes an equal amount of water to vaporize, thereby producing stream 3.22. This sequence of condensation and vaporization is repeated through each effect of the desalinization unit. The vapor from the first effect of the desalinization unit is compressed slightly by the compressor CX to allow it to condense against the condensate stream 3.4 in the tank T1. This preheated condensate stream is the feed to the preheaters HX-1 and HX-2 of the high-pressure and low-pressure deareators DAH and DAL. The condensate from stream 3.27 returns to the flash tank FT via line 3.16. Preheating the condensate stream 3.4 prior to passing it through the feedwater preheaters in this way improves the thermal efficiency of the power plant.

The flow control valve FCV on the suction side of the compressor CX is used to control the amount of fresh water that is produced. A speed indicator controller SIC on the compressor is used to control the pressure and thereby the temperature of the desalinization unit DU and the flash tank FT.

In a non-desalinization mode, the desalinization unit is isolated by blocking valves V3, V4, and V5 and the flow control valve FCV is used to control the pressure of the flash tank FT. In the non-desalinization mode, stream 3.20 is directed through the condensate tank T1 and to the flash tank FT. Very little work is required from the compressor CX since the temperature of the flash tank FT is higher than the temperature of the condensate in the tank T1.

TABLE 3

100 MW POWER PLANT, LOW-PRESSURE BOILER, HEAT RECOVERY

| STREAM | T (° F.) | P (psia) | m (lbs/hr) |
|---|---|---|---|
| 3.1 | 1000 | 100.0 | 655,000 |
| 3.2 | 150 | 2.5 | 655,000 |
| 3.3 | — | — | — |

TABLE 3-continued

100 MW POWER PLANT, LOW-PRESSURE BOILER, HEAT RECOVERY

| STREAM | T (° F.) | P (psia) | m (lbs/hr) |
|---|---|---|---|
| 3.4 | 80 | 0.5 | 655,000 |
| 3.5 | 132 | 35.0 | 655,000 |
| 3.6 | 141 | 35.0 | 616,000 |
| 3.7 | 223 | 1325.0 | 669,400 |
| 3.8 | 260 | 35.0 | 53,400 |
| 3.9 | 132 | 35.0 | 39,000 |
| 3.10 | 275 | 14.7 | 1,096,000 |
| 3.11 | 150 | 14.7 | 1,096,000 |
| 3.12 | 80 | 14.7 | 337,000 |
| 3.13 | 90 | 0.70 | 303,300 |
| 3.14 | 120 | 1.7 | 202,200 |
| 3.15 | 130 | 2.2 | 168,500 |
| 3.16 | 130 | 2.2 | 67,400 |
| 3.17 | 140 | 2.9 | 307,300 |
| 3.18 | 140 | 45.0 | 273,600 |
| 3.19 | 265 | 45.0 | 273,600 |
| 3.20 | 140 | 2.9 | 33,700 |
| 3.21 | 130 | 2.2 | 33,700 |
| 3.22 | 130 | 2.2 | 33,700 |
| 3.23 | 120 | 1.7 | 33,700 |
| 3.24 | 100 | 0.95 | 33,700 |
| 3.25 | 90 | 0.70 | 33,700 |
| 3.26 | 90 | 0.70 | 33,700 |
| 3.27 | 142 | 3.0 | 33,700 |
| 3.28 | 132 | 2.3 | 33,700 |
| 3.29 | 112 | 1.4 | 168,500 |

Thus, in the present process, water at a temperature near, or slightly above the dewpoint of stream 1.19 from the stack exhaust of the typical single boiler power plant of FIG. 1 is circulated through a secondary economizer SE (heat exchanger) to remove heat from the stack exhaust 1.19 or 2.19. The heated water is then flashed to produce steam. This steam is then used as the heat supply for a multi-effect desalanization unit DU. The heat from the stack exhaust is recovered by condensing stream 3.27 (FIG. 3) against stream 1.3 (FIG. 1). By recovering the heat in this way corrosion is avoided and, at the same time, thermal efficiency is improved.

The use of the secondary economizer and the multi-effect evaporator, allows low-pressure steam to be used for preheating and deareation, rather than high-pressure steam, and thereby increases the net high-pressure steam capacity. When incorporated into a typical power plant, the present process produces approximately a 1% improvement in fuel usage and approximately a 10% increase in high-pressure steam capacity, with the added benefit of being able to produce fresh water from salinous seawater or water which contains minerals, salts, and other dissolved solids.

While this invention has been described fully and completely with special emphasis upon a preferred embodiment, it should be understood that within the scope of the appended claims the invention may be practiced otherwise than as specifically described herein.

We claim:

1. A process for improving the thermal and energy efficiency of a steam turbine power generation plant, comprising the steps of:

connecting a secondary economizer in a combustion exhaust path of a high-pressure boiler to be heated by a combustion exhaust of said high-pressure boiler, said combustion exhaust having a known temperature and dewpoint, and said secondary economizer further with a flash tank and having a conduit passing through a condenser condensate collection tank;

providing a multi-effect desalination train connected with said flash tank and said condenser condensate collection tank to circulate low-pressure steam from said flash tank, through consecutive effects of said desalinization train, through said condenser condensation collection tank, and back into said flash tank;

introducing feedwater into said high-pressure boiler and boiling it to produce high-pressure steam;

introducing salinous water or water containing minerals, salts, and dissolved solids into said consecutive effects of said desalinization train;

superheating a portion of said high-pressure steam by passing it through the combustion exhaust of said high-pressure boiler, and expanding it across a steam-operated power generating turbine to generate power;

reheating said high-pressure steam after expanding it across said turbine a first time by passing it through the combustion exhaust of said high-pressure boiler and thereafter expanding it across said turbine a second time and utilizing the generated power as a product;

condensing the steam exhausted from said turbine and collecting it in said condenser condensate collection tank;

passing fresh water condensate through said secondary economizer and flashing said fresh water condensate in said flash tank to produce low-pressure steam;

heat exchanging said low-pressure steam from said flash tank against said collected condenser condensate to initially heat said condenser condensate and to condense said low-pressure steam into said fresh water condensate such that said fresh water condensate has a temperature about the same or greater than the dewpoint of said combustion exhaust of said high-pressure boiler;

conducting said low-pressure steam from said flash tank through a last effect of said desalinization train to heat and desalinize said salinous water or water containing minerals, salts, and dissolved solids and to condense said low-pressure steam into fresh water, mixing it with said fresh water condensate, and conducting the mixture back into said flash tank;

preheating said initially heated condenser condensate in a high-pressure preheater and passing said preheated condenser condensate through a high-pressure deareator to remove dissolved gases;

removing high-pressure blowdown from said high-pressure boiler and feeding it to said high-pressure preheater to preheat said initially heated condenser condensate;

feeding another portion of said high-pressure steam produced by said high-pressure boiler to said high-pressure deareator to control the temperature of said condenser condensate;

reheating said preheated and deareated condenser condensate by passing it through a primary economizer heated by the combustion exhaust of said high-pressure boiler;

utilizing said reheated and deareated condenser condensate as said feedwater for said high-pressure boiler; and utilizing said fresh water condensate having a temperature about the same or greater than the dewpoint of said combustion exhaust of said high-pressure boiler to recover waste heat from said combustion exhaust.

2. The process according to claim 1 further comprising the step of compressing said low-pressure steam from said flash tank prior to heat exchanging it against said collected condenser condensate.

3. The process according to claim 1 comprising the further steps of:

conducting vapor of said heated salinous water or water containing minerals, salts, and dissolved solids from said last effect of said desalinization train consecutively through a second and a first effect of said desalinization train to heat and desalinize said salinous water or water containing minerals, salts, and dissolved solids contained therein and to condense said vapor into fresh water.

4. The process according to claim 3 comprising the further steps of:

mixing vapor of said heated salinous water or water containing minerals, salts, and dissolved solids from said first effect of said desalinization train with said low-pressure steam from said flash tank, and heat exchanging said mixture against said collected condenser condensate.

5. The process according to claim 4 further comprising the step of compressing said mixture of said low-pressure steam from said flash tank and said vapor from said first effect prior to heat exchanging it against said collected condenser condensate.

6. The process according to claim 1 comprising the further steps of:

providing a low-presure boiler operating at a lower temperature and pressure than said high-pressure boiler;

introducing feedwater into said low-pressure boiler and boiling it to produce low-pressure steam;

mixing a combustion exhaust of said low-pressure boiler with said combustion exhaust of said high-pressure boiler;

feeding a portion of said initially heated condenser condensate through a low-pressure deareator to remove dissolved gases, and utilizing said deareated condenser condensate as a portion of said feedwater for said low-pressure boiler;

feeding a portion of said high-pressure blowdown removed from said high-pressure boiler to said low-pressure deareator to control the temperature of said condenser condensate; and preheating a portion of said initially heated condenser condensate in a low-pressure preheater, and passing said portion of preheated condenser condensate through the low-pressure deareator to remove dissolved gases, and utilizing said preheated and deareated condenser condensate as a portion of said feedwater for said low-pressure boiler.

7. A process for improving the thermal and energy efficiency of an existing steam turbine power generation plant having a high-pressure boiler with a combustion exhaust of known temperature and dewpoint, comprising the steps of:

adding a secondary economizer in a combustion exhaust path of an existing high-pressure boiler to be heated by the combustion exhaust of said high-pressure boiler, said secondary economizer connected with a flash tank and having a conduit passing through a condenser condensate collection tank connected with the steam exhaust of the steam turbine;

adding a multi-effect desalination train connected with said flash tank and said condenser condensate collection tank to circulate low-pressure steam from said flash tank, through consecutive effects of said desalinization train, through said condenser condensation collection tank, and back into said flash tank;

condensing the steam exhausted from a turbine and collecting it in said condenser condensate collection tank;

passing fresh water condensate through said secondary economizer and flashing said fresh water condensate in said flash tank to produce low-pressure steam;

introducing salinous water or water containing minerals, salts, and dissolved solids into said consecutive effects of said desalinization train;

heat exchanging said low-pressure steam from said flash tank against said collected condenser condensate to initially heat said condenser condensate and to condense said low-pressure steam into said fresh water condensate such that said fresh water condensate has a temperature about the same or greater than the dewpoint of said combustion exhaust of said high-pressure boiler;

conducting said low-pressure steam from said flash tank through a last effect of said desalinization train to heat and desalinize said salinous water or water containing minerals, salts, and dissolved solids and to condense said low-pressure steam into fresh water, mixing it with said fresh water condensate, and conducting the mixture back into said flash tank;

preheating said initially heated condenser condensate in a high-pressure preheater and passing said preheated condenser condensate through a high-pressure deareator to remove dissolved gases;

reheating said preheated and deareated condenser condensate by passing it through a primary economizer heated by the combustion exhaust of said high-pressure boiler and utilizing said reheated and deareated condenser condensate as feedwater for said high-pressure boiler; and utilizing said fresh water condensate having a temperature about the same or greater than the dewpoint of said combustion exhaust of said high-pressure boiler to recover waste heat from said combustion exhaust.

8. The process according to claim 7 further comprising the step of compressing said low-pressure steam from said flash tank prior to heat exchanging it against said collected condenser condensate.

9. The process according to claim 7 comprising the further steps of:

conducting vapor of said heated salinous water or water containing minerals, salts, and dissolved solids from said last effect of said desalinization train consecutively through a second and a first effect of said desalinization train to heat and desalinize said salinous water or water containing minerals, salts, and dissolved solids contained therein and to condense said vapor into fresh water.

10. The process according to claim 9 comprising the further steps of:

mixing vapor of said heated salinous water or water containing minerals, salts, and dissolved solids from said first effect of said desalinization train with said low-pressure steam from said flash tank, and heat exchanging said mixture against said collected condenser condensate.

11. The process according to claim 10 further comprising the step of compressing said mixture of said low-pressure steam from said flash tank and said vapor from said first effect prior to heat exchanging it against said collected condenser condensate.

12. A process for improving the thermal and energy efficiency of a steam turbine power generation plant having a high-pressure boiler with a combustion exhaust of known temperature and dewpoint, comprising the steps of:

connecting a secondary economizer in a combustion exhaust path of an existing high-pressure boiler to be heated by the combustion exhaust of said high-pressure boiler, said secondary economizer further connected with a flash tank and having a conduit passing through a condenser condensate collection tank connected with the steam exhaust of the steam turbine;

providing a multi-effect desalination train connected with said flash tank and said condenser condensate collection tank to circulate low-pressure steam from said flash tank, through consecutive effects of said desalinization train, through said condenser condensation collection tank, and back into said flash tank;

condensing the steam exhausted from said turbine and collecting it in said condenser condensate collection tank;

passing fresh water condensate through said secondary economizer and flashing said fresh water condensate in said flash tank to produce low-pressure steam;

introducing salinous water or water containing minerals, salts, and dissolved solids into said consecutive effects of said desalinization train;

heat exchanging said low-pressure steam from said flash tank against said collected condenser condensate to initially heat said condenser condensate and to condense said low-pressure steam into said fresh water condensate such that said fresh water condensate has a temperature about the same or greater than the dewpoint of said combustion exhaust of said high-pressure boiler;

conducting said low-pressure steam from said flash tank through a last effect of said desalinization train to heat and desalinize said salinous water or water containing minerals, salts, and dissolved solids and to condense said low-pressure steam into fresh water, mixing it with said fresh water condensate, and conducting the mixture back into said flash tank;

preheating said initially heated condenser condensate in a preheater and passing said preheated condenser condensate through a deareator to remove dissolved gases; and utilizing a portion of said deareated condenser condensate as feedwater for said high-pressure boiler.

* * * * *